United States Patent [19]

Smith et al.

[11] Patent Number: 4,865,277
[45] Date of Patent: Sep. 12, 1989

[54] COPILOT QUICK CONNECT CYCLIC STICK

[75] Inventors: Andrew Smith, Arlington; Frank Wolstencroft, Bedford, both of Tex.

[73] Assignee: Bell Helicopter Textron Inc., Fort Worth, Tex.

[21] Appl. No.: 132,949

[22] PCT Filed: Jun. 15, 1987

[86] PCT No.: PCT/US87/01360
§ 371 Date: Jun. 15, 1987
§ 102(e) Date: Jun. 15, 1987

[87] PCT Pub. No.: WO88/10209
PCT Pub. Date: Dec. 29, 1988

[51] Int. Cl.$^4$ .................................... B64C 13/04
[52] U.S. Cl. .................... 244/234; 244/229; 74/471 XY; 74/523; 74/548; 403/325
[58] Field of Search ............... 244/234, 229, 220, 221, 244/237; 74/548, 523, 524, 471 XY; 403/322, 325

[56] References Cited

U.S. PATENT DOCUMENTS

| 1,304,420 | 5/1919 | Verner | 244/229 |
| 1,327,183 | 1/1920 | Van Allen | 244/229 |
| 1,747,777 | 2/1930 | Kimble | 244/229 |
| 1,817,204 | 8/1931 | Petersen | 244/229 |
| 2,163,114 | 6/1939 | Ziegler | 244/229 |
| 4,012,014 | 3/1977 | Marshall | 244/234 |
| 4,073,199 | 2/1978 | Simons | 403/96 |
| 4,473,203 | 9/1984 | Barnoin et al. | 244/224 |

FOREIGN PATENT DOCUMENTS 124363 3/1919 United Kingdom ................ 244/229

Primary Examiner—Galen Barefoot
Assistant Examiner—L. M. Fiorito
Attorney, Agent, or Firm—Richards, Harris, Medlock & Andrews

[57] ABSTRACT

An aircraft flight control stick is mounted on a gimbal which provides left, right, forward and aft pivotal motion of the stick. A pivot member that is mechanically linked to the aircraft flight controls is attached to the gimbal through a uni-ball bearing which allows the pivot member to pivot independently of the control stick. A bell-shaped housing is slidably mounted on the control stick. The housing is spring-biased downward toward the pivot member so that a stud protruding upward from the pivot member plugs into a socket in the housing. A lever assembly mounted on the control stick and attached to the housing can be actuated to slide the housing away from the pivot member, thereby unplugging the stud from the socket to disengage the control stick from the aircraft flight controls. The downward facing housing circumscribes all possible motion of the stud while the control stick is disengaged. Release of the lever assembly allows a spring to urge the housing downward toward the stud. The conical-shaped interior of the housing guides the stud into the socket to reconnect the control stick to the pivot member and the aircraft flight controls. The reconnection of the control stick is accomplished rapidly without the possibility of jamming the flight controls.

10 Claims, 2 Drawing Sheets

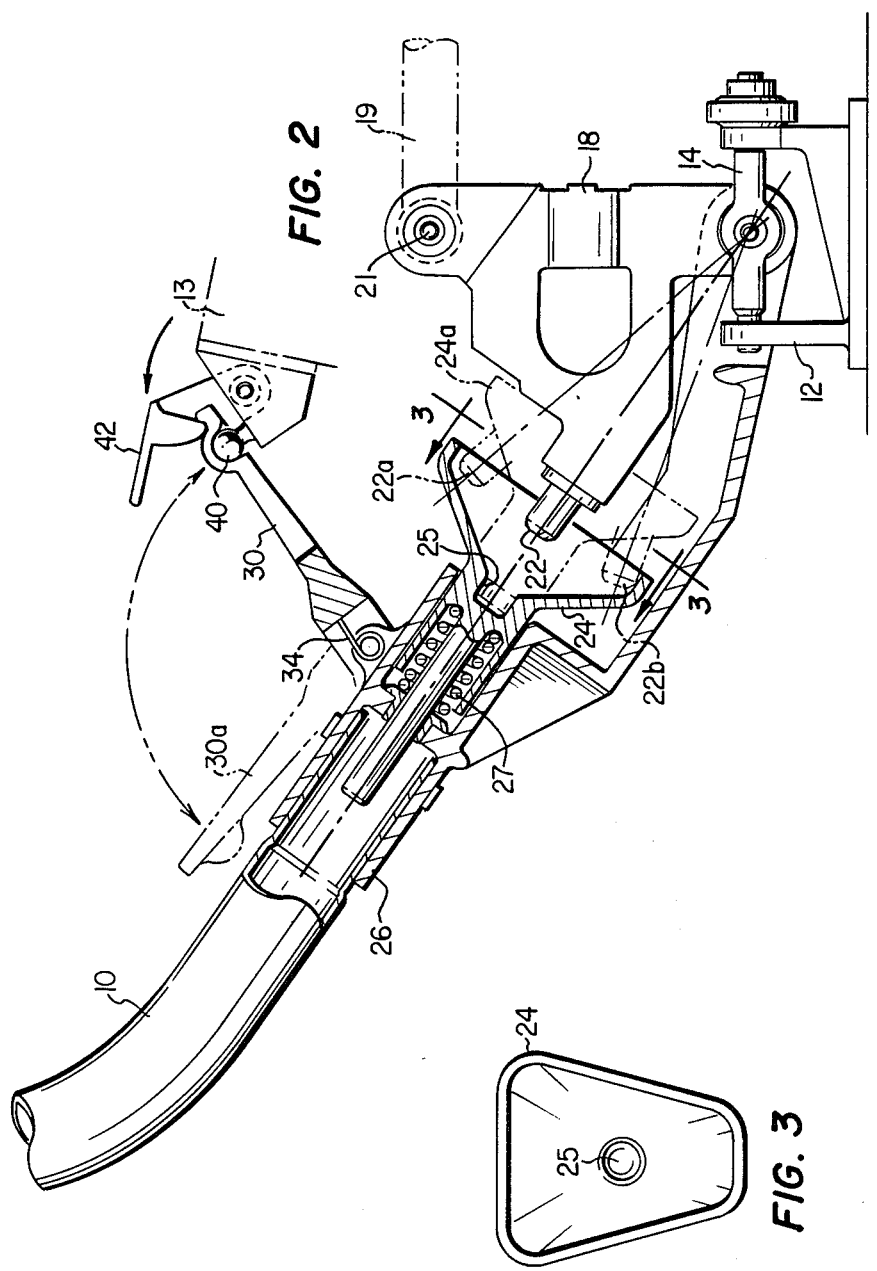

COPILOT QUICK CONNECT CYCLIC STICK

TECHNICAL FIELD

This invention relates to aircraft flight control systems and, in particular, to a disengageable copilot control stick that can be reconnected quickly without jamming.

BACKGROUND OF THE INVENTION

In dual control aircraft utilizing mechanical linkage, the copilot's control column or stick is linked to the pilot's control stick so that both controls move together in a parallel manner. The dual controls are designed to allow either the pilot or the copilot to have full control over the aircraft at all times during flight.

In some aircraft having dual controls, such as helicopters and military aircraft, it may be advantageous to disengage the copilot's control stick from the pilot's controls during certain phases of the flight. For example, when the copilot is not actively piloting the aircraft, the copilot may be occupied with other tasks, such as navigation, radar operation, and computer system operation. While the copilot is performing these other tasks, inadvertent jolts or pressures on the copilot's control stick can cause undesirable and possibly unsafe inputs to the aircraft flight controls. Because this problem can affect flight safety, copilot control sticks have been designed to be disengageable from the aircraft flight control system.

Disengageable copilot control sticks, which are designed for convenience and safety, can become a safety hazard if they are slow or difficult to reengage, or if it is possible for them to become jammed while being reconnected with the aircraft flight control system. During aircraft flight with the copilot's control stick disengaged, any malfunction of the stick-throttle interconnect (i.e. the pilot) may necessitate rapid reconnection of the copilot's stick so that the copilot can regain control of the aircraft.

Disengageable copilot control sticks currently available have not been totally satisfactory because they are difficult and/or slow to reengage and because they can become jammed during reconnection if the copilot attempts to apply any force to the stick before it is fully connected. Some disengageable copilot sticks utilize a ball or stud which is spring-loaded into a socket at the bottom of a bowl or inverse-conical shaped receptacle. These sticks are disengaged by overcoming the spring force to remove the ball or stud from the socket in the bottom of the bowl. Reconnection of these control sticks is accomplished by allowing the spring to urge the ball or stud down the sloping sides of the bowl and into the socket. However, reconnection cannot be accomplished if the copilot applies a force to the copilot's control stick counter to the force applied through the pilot's stick. Furthermore, the bowl-shaped receptacle is particularly suited for catching dirt and foreign objects that can jam the ball or stud and prevent its reinsertion into the socket of the receptacle.

Thus, a need has been identified for a disengageable copilot control stick that can be rapidly reconnected to the aircraft flight control system. Such a control stick should also provide some degree of aircraft control before it is fully connected, should not provide a catch-basin for dirt and other foreign objects, and should not become jammed during reconnection even if the copilot inputs control stick forces counter to those of the pilot.

SUMMARY OF THE INVENTION

The present invention is a disengageable copilot's quick connect cyclic control stick for dual controlled aircraft. The copilot's stick is designed to be easily disengaged from the aircraft flight control system and rapidly reconnected without jamming.

The present invention comprises a copilot's control stick that is releasably connected to a pivot assembly at the base of the control stick. The lower portion of the control stick comprises a fork that is attached to the outside of a gimbal member which is mounted in a support assembly. The pivot assembly is joined by means of a uni-ball bearing to the inside of the gimbal member. A single shaft extends through the fork of the stick, the gimbal member, and the uni-ball bearing of the pivot assembly. When the stick is connected to the pivot assembly, the stick and the pivot assembly can be pivoted as a unit left and right on the gimbal assembly and forward and aft on the shaft. These motions of the control stick control the roll and pitch of the aircraft.

The pivot assembly includes a stud extending forward and upward along the axis of the lower end of the control stick. The stud fits into a socket at the forward and upper end of a cone or bell-shaped housing or receptacle attached to the control stick. An extension of the housing is slidably mounted in a sleeve of the control stick. A lever assembly is pivotally mounted on the control stick and attached to the receptacle. Pivoting the lever assembly forces the housing to move in a forward and upward direction in the sleeve of the stick so as to lift the housing off the stud of the pivot assembly. The end of the lever assembly remote from the end attached to the housing can be pivoted to engage a hitch under the copilot's seat and secured thereto by a lock/release catch. Engagement of the lever assembly on the hitch disengages the socket from the stud of the pivot assembly and locks the control stick in a central fixed position. The pivot assembly, which is connected by a linkage to the pilot's stick and the aircraft flight control system, remains free to pivot about the uni-ball bearing without interference from the disengaged copilot's control stick. The open lower end of the housing surrounds the stud and circumscribes the movement of the stud as the pivot assembly moves independently of the disengaged control stick.

The copilot's stick is reconnected to the aircraft flight control system by releasing the lock/release so that the lever assembly is free to pivot back to its normal position. The housing is spring loaded in the sleeve of the control stick so as to be forced downward and aft onto the stud of the pivot assembly. The interior conical surface of the housing centers the housing on the stud so that the stud is reengaged in the socket of the housing.

Because the housing of the present invention opens downward, it does not form a basin for catching dirt and foreign objects which might jam the controls during reconnection of the stick. Also, the shape of the housing is designed to encompass all movements of the stud while the stick is disconnected so that the housing always confines the stud during reconnection of the control stick. Furthermore, copilot inputs to the control stick during reconnection will have at least partial effect on the aircraft flight controls due to the force of the housing on the stud even before the stud is reinserted into the socket.

BRIEF DESCRIPTION OF THE DRAWINGS

For a more complete understanding of the present invention and for further advantages thereof, reference is now made to the following Description of the Preferred Embodiment taken in conjunction with the accompanying Drawings, in which:

FIG. 2 is a partially cutaway left side plan view of the control stick of the present invention; and FIG. 3 is a bottom plan view of the housing of the present invention as viewed from the section line 3—3 of FIG. 2.

DESCRIPTION OF THE PREFERRED EMBODIMENT

Figure 1:
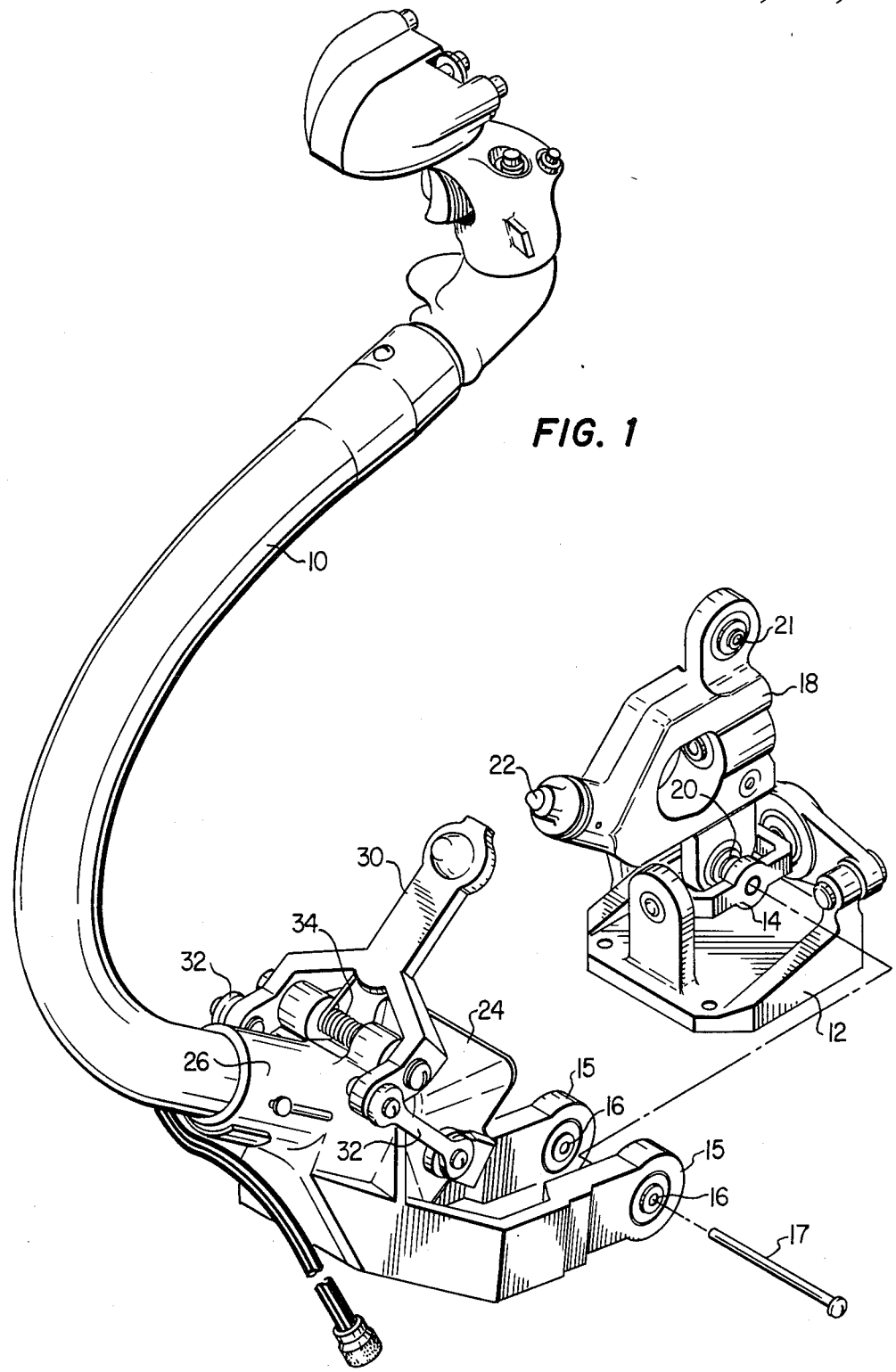
FIG. 1 is a partially exploded isometric view of the copilot quick connect cyclic stick of the present invention.

Referring to the FIGURES, like reference numerals indicate the same elements in the different views of the invention. In FIGS. 1 and 2, the copilot quick connect cyclic stick of the present invention is generally identified by the reference numeral 10.

The control stick 10 is mounted on a support assembly 12, which is typically bolted to the floor of the aircraft beneath the copilot's seat 13. A gimbal member 14 is mounted for pivotal motion in the support assembly 12. The control stick 10 comprises a fork assembly 15 at its lower end. The fork 15 is mounted on the outside of the gimbal member 14 by bearings 16 and a shaft 17 which extends through the bearings 16 and the gimbal member 14. Thus, the control stick 10 is pivotable left and right on the gimbal member 14 and forward and aft on the shaft 17. These pivotal motions of the control stick 10 provide roll and pitch control inputs to the aircraft flight control system.

A pivot member 18 is mounted to the inside of the gimbal member 14 by means of a uni-ball bearing 20. The shaft 17 extends through the bearings 16, the gimbal member 14, and the uni-ball bearing 20. The uni-ball bearing 20 allows the pivot member 18 to pivot left, right, forward, and aft independently of the motion of the control stick 10. A bearing 21 of the pivot member 18 provides a connection for mechanical linkage 19 to the aircraft flight controls. The pivot member 18 also includes a stud 22 that extends forward and upward from the pivot member 18.

A cone or bell-shaped receptacle or housing 24 is positioned between the forks 15 and slidably mounted within a sleeve 26 of the control stick 10. A coil spring 27 inside the sleeve 26 urges the housing 24 downward and aft so that the stud 22 of the pivot member 18 plugs into a socket 25 at the vertex of the housing 24. When the plug 22 is engaged in the socket 25, the control stick 10 and the pivot member 18 are rigidly connected and pivot in unison on the gimbal member 14 and the shaft 17.

A lever assembly 30 is pivotally mounted on the control stick 10 and attached to arms 32 which are connected to the housing 24. A coil spring 34 biases the lever assembly 30 upward and away from the pivot member 18. Actuation of the lever assembly toward the pivot member 18 causes the housing 24 to slide forward and upward against the spring 27 in the sleeve 26 so as to unplug the stud 22 from the socket 25. As shown in FIG. 2, the actuated lever assembly 30 is pivoted to engage a hitch 40 mounted on or under the copilot's seat 13. A catch 42 is used to lock the lever assembly 30 on the hitch 40. With the lever assembly 30 locked on the hitch 40, the control stick 10 is rigidly fixed in a central position and disengaged from the pivot member 18, which remains free to pivot about the uni-ball bearing 20 independent of the control stick 10. However, the housing 24 extends around and circumscribes the full extent of the movement of the stud 22 (as illustrated in phantom by 22a and 22b in FIG. 2) while the pivot member 18 moves and the control stick 10 remains fixed in place.

Referring primarily to FIG. 2, the disengaged control stick 10 is quickly reengaged with the aircraft flight control system simply by releasing the catch 42 to unlock the lever assembly 30. With the catch 42 released, the spring 34 pivots the lever assembly 30 off the hitch 40 and away from the pivot member 18 as illustrated in phantom by 30a. The spring 27, acting in conjunction with the spring 34, strongly urges the housing 24 downward and aft onto the stud 22 as illustrated in phantom by 24a. The conical-shaped interior of the housing 24 guides the stud 22 into the socket 25 to rigidly reconnect the control stick 10 to the pivot member 18, whereupon the control stick 10 and the pivot member 18 pivot in unison on the gimbal 14 and the shaft 17.

The control stick 10 of the present invention cannot jam the aircraft flight controls during reconnection because the stud 22 never departs from the confines of the conical-shaped housing 24. In addition, the housing 24 opens downward so that dirt and foreign objects will not fall into the socket 25 to prevent reconnection of the control stick 10 to the pivot member 18. Furthermore, the housing 24 of the present invention provides some input to the flight control system due to the force of the housing against the stud 22 even when the stud 22 is not inserted in the socket 25.

Whereas the present invention has been described with respect to a specific embodiment thereof, it is apparent that various changes and modifications may be suggested to one skilled in the art and it is intended that this invention encompass such changes and modifications as fall within the scope of the appended claims.

We claim:

1. A disengageable aircraft control stick, comprising:
   gimbal means for mounting the control stick in the aircraft;
   a pivot assembly having a stud protruding upwardly therefrom;
   a universal bearing for mounting said pivot assembly on said gimbal means and for providing pivotal movement of said pivot assembly independent of the control stick;
   a bell-shaped housing attached to the control stick and having a socket for engaging said stud;
   means for disengaging said socket from said stud to disconnect the control stick from said pivot assembly, said housing circumscribing the movement of said stud after disconnection of the control stick; and
   means for urging said housing toward said stud, said housing guiding said socket onto said stud to reconnect the control stick to said pivot assembly.

2. The disengageable aircraft control stick of claim 1, wherein said pivot assembly is attached to a linkage connected to the aircraft flight controls.

3. The disengageable aircraft control stick of claim 1, further comprising:
   means for releasably locking the disconnected control stick in a fixed position; and means for releasing said locking means, thereby reconnecting the control stick to said pivot assembly.

4. A disengageable aircraft control stick, comprising:
gimbal means for pivotally mounting the control stick in the aircraft;
a pivot member connected to the aircraft flight controls, said pivot member having a stud protruding upwardly therefrom;
universal bearing means for mounting said pivot member on said gimbal means for pivotal movement independent of the control stick;
a bell-shaped housing attached to the control stick, said housing having a socket means for engaging said stud to provide a rigid connection between the control stick and said pivot member;
means for disengaging said socket means from said stud, thereby disconnecting the control stick from said pivot means;
said housing of the disconnected control stick circumscribing the movement of said stud;
means for releasably locking the disconnected control stick in a fixed position;
means for releasing said locking means; and
means for urging said housing toward said stud, said bell-shaped housing guiding said socket onto said stud, thereby reconnecting the control stick to said pivot member.

5. The disengageable aircraft control stick of claim 4, wherein the control stick includes a fork assembly for mounting the control stick to said gimbal means.

6. The disengageable aircraft control stick of claim 4, wherein said universal bearing means comprises a uni-ball bearing.

7. The disengageable aircraft control stick of claim 4, wherein said disengaging means comprises:
a sleeve connected to the control stick for slidably mounting said housing to the control stick; and
a lever assembly mounted on the control stick and attached to said housing, wherein actuation of said lever assembly slides said housing away from said stud to disconnect the control stick from said pivot member.

8. A copilot quick connect cyclic control stick, comprising:
a support assembly rigidly affixed to the aircraft;
a gimbal member for mounting the control stick on said support assembly, said gimbal member providing left, right, forward, and aft pivotal motion of the control stick with respect to said support assembly;
a pivot member having a stud protruding upward therefrom, said pivot member providing a linkage to the aircraft flight controls;
a uni-ball bearing connecting said pivot member to said gimbal member, said uni-ball bearing providing left, right, forward, and aft pivotal motion of said pivot member independent of the control stick;
a bell-shaped housing slidably mounted on the control stick, said housing having a socket for engaging said stud;
means for biasing said housing toward said pivot member to plug said stud into said socket, thereby joining the control stick and said pivot member for unitary pivotal movement;
a lever assembly mounted on the control stick and attached to said housing wherein actuation of said lever assembly slides said housing away from said pivot member to disengage said stud from said socket, thereby disconnecting the control stick from the aircraft flight controls;
means for releasably locking said actuated lever assembly to retain the control stick in a fixed position; and
means for releasing said locked lever assembly, thereby allowing said biasing means to urge said socket onto said stud to reconnect the control stick to said pivot member.

9. The copilot control stick of claim 8, wherein the control stick comprises a fork assembly for mounting on said gimbal member.

10. The copilot control stick of claim 9, wherein a shaft extends through and joins said fork assembly, said gimbal member, and said uni-ball bearing.

* * * * *